(12) United States Patent
Helander et al.

(10) Patent No.: US 8,326,772 B2
(45) Date of Patent: Dec. 4, 2012

(54) METHOD AND APPARATUS FOR CAPACITY- AND VALUE-BASED PRICING MODEL FOR PROFESSIONAL SERVICES

(75) Inventors: Mary E. Helander, North White Plains, NY (US); Clarence L. Wardell, III, Atlanta, GA (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1496 days.

(21) Appl. No.: 11/763,733

(22) Filed: Jun. 15, 2007

(65) Prior Publication Data

US 2008/0313101 A1 Dec. 18, 2008

(51) Int. Cl.
*G06Q 99/00* (2006.01)
(52) U.S. Cl. .............. 705/400; 705/1.1; 705/32; 705/40
(58) Field of Classification Search .................. 705/1.1, 705/400, 7–10, 26, 28, 402, 32, 40, 37
See application file for complete search history.

(56) References Cited

U.S. PATENT DOCUMENTS

| | | | |
|---|---|---|---|
| 6,038,554 A * | 3/2000 | Vig | 705/400 |
| 6,195,646 B1 * | 2/2001 | Grosh et al. | 705/26.41 |
| 6,226,625 B1 * | 5/2001 | Levenstein | 705/400 |
| 7,552,095 B2 * | 6/2009 | Kalyan | 705/400 |
| 2003/0033237 A1 * | 2/2003 | Bawri | 705/37 |
| 2004/0215550 A1 * | 10/2004 | Preist et al. | 705/37 |
| 2004/0225620 A1 * | 11/2004 | Faustino et al. | 705/400 |
| 2008/0263632 A1 * | 10/2008 | Keon | 726/3 |
| 2008/0270222 A1 * | 10/2008 | Goel | 705/10 |

OTHER PUBLICATIONS

Hanson, Ward, "The Dynamics of Cost-Plus Pricing", Mar.-Apr. 1992; Managerial and Decision Economics, vol. 13, No. 2, pp. 149-161.*

* cited by examiner

*Primary Examiner* — John Hayes
*Assistant Examiner* — Freda A Nelson
(74) *Attorney, Agent, or Firm* — Daniel P. Morris; McGinn IP Law Group, PLLC

(57) ABSTRACT

A method and structure for pricing a good or service to a customer includes a calculator that executes a pricing model that includes a dimension of a utility of the good or service to the customer.

17 Claims, 9 Drawing Sheets

200

Objective Function (201):

$$\max_r \sum_{j=1}^{M} \sum_{t=1}^{T} \sum_{s=1}^{t} [\sum_{i=1}^{N} (\sum d_i^s p_{ij}^{st}(r) r_{ij}^{st} - g(r)_j^t \sum_{k=1}^{R} a_{jk}\rho_k^t)]$$

Subject to:

Constraints (202):

(Capacity) $\sum_{j=1}^{M} a_{jk} g(r)_j^t \geq z_k^t, \forall t=1\ldots T, \forall k=1\ldots R$ (Non-negativity) $r_{ij}^{st} \geq 0 \quad \forall s, t=1\ldots T, \forall i=1\ldots N, \forall j=1\ldots M$ (Monotonicity) $r_{ij}^{st} \geq r_{ij}^{s(t+1)} \quad \forall s, t \leq s=1\ldots T, \forall i=1\ldots N, \forall j=1\ldots M$

Computations (203):

(Expected number of active engagements)

$$g(r)_j^t = \sum_{i=1}^{N} \sum_{s=1}^{t} [\sum_{v=\max(t-\mu_{ij}+1,s)}^{t} d_i^s p_{ij}^{sv}(r)] \quad \forall j=1\ldots N, \forall t=1\ldots T$$

(Definition of customer utility)

$$U_{ij}^{st} = v_{ij} - \alpha_{ij} * r_{ij}^{st} - \beta_{ij} * (t-s) \quad \forall s, t=1\ldots T, \forall i=1\ldots N, \forall j=1\ldots M$$

(Definition of customer probability)

$$p_{ij}^{st} = \frac{e^{\theta U_{ij}^{st}(r_{ij}^{st})}}{e^{\theta U_{i0}^s} + \sum_{t'=s}^{T}\sum_{j'=1}^{M} e^{\theta U_{ij'}^{st'}(r_{ij'}^{st'})}} \quad \forall s, t=1\ldots T, \forall i=1\ldots N, \forall j=1\ldots M$$

601 Upper Bound on Price = 20

Daily Pay Rate (R x T)

|   | 1 | 2 | 3 | 4 | 5 |
|---|---|---|---|---|---|
| 1 | 10 | 5 | 10 | 5 | 10 |
| 2 | 5 | 10 | 5 | 10 | 5 |

602 Request Matrix (N x T)

|   | 1 | 2 | 3 | 4 | 5 |
|---|---|---|---|---|---|
| 1 | 1 | 2 | 3 | 0 | 1 |
| 2 | 5 | 1 | 2 | 2 | 1 |
| 3 | 3 | 0 | 2 | 1 | 3 |

603 Staffing Matrix (N x R)

|   | 1 | 2 |
|---|---|---|
| 1 | 1 | 2 |
| 2 | 0 | 1 |
| 3 | 1 | 0 |
|   | .46 | .54 |

604 Avg. Duration (N x M)

|   | 1 | 2 | 3 |
|---|---|---|---|
| 1 | 187 | 223 | 410 |
| 2 | 187 | 223 | 410 |
| 3 | 187 | 223 | 410 |

METHOD AND APPARATUS FOR CAPACITY- AND VALUE-BASED PRICING MODEL FOR PROFESSIONAL SERVICES

BACKGROUND OF THE INVENTION

1. Field of the Invention

The present invention generally relates to a method for pricing services, such as professional services. More specifically, a capacity and value based pricing (CVBP) model systematically correlates "value" to the potential purchaser, along with several other attributes, into the price of professional services.

2. Description of the Related Art

The present invention was derived out of a need for a new way to think about how professional service "products" should be priced in a competitive marketplace. The price of any good or service should represent an aggregate of the value assigned to the various attributes of the product (for which there may be a rather large number). For services, in particular, there are several views on how this pricing decision should be undertaken.

Traditionally the pricing decision in professional services has fallen into the category of what is called "cost-plus" pricing. Cost-plus is the idea that service engagements are priced based on the costs incurred by the provider in supplying their services plus some pre-determined margin on these costs. While this is a feasible way to price service goods, it is not necessarily the most efficient way, with respect to overall profit, to approach the pricing problem.

In the face of this de facto pricing method companies have sought ways to more accurately price their products based on the value that is provided to the client. It is the assumption that if pricing is more closely correlated with value, then profit margins can be increased without having to increase staff or workload significantly.

It was in this vain that the present invention was developed. The present inventors realized that a need exists to systematically correlate "value", along with other attributes, into the price of services, particularly professional services.

SUMMARY OF THE INVENTION

In view of the foregoing, and other, exemplary problems, drawbacks, and disadvantages of the conventional systems, it is an exemplary feature and advantage of the present invention to provide a structure (and method) in which value to a customer is a dimension in the pricing model for services.

It is another exemplary feature of the present invention wherein a pricing model selectively evaluates service as provided at a future time as part of the pricing exercise.

It is another exemplary feature to provide a pricing model wherein different service packages can be bundled together as part of the pricing exercise, including different combinations of service bundles.

In a first exemplary aspect of the present invention, to achieve the above exemplary features and objects, described herein is an apparatus including a calculator for pricing a good or a service to a customer, the calculator executing a pricing model that includes a dimension of a utility of the good or the service to the customer.

In a second exemplary aspect, the present invention also provides a computerized method for pricing a good or service to a customer, the method including executing a pricing model that includes a dimension of a utility of the good or service to the customer.

In a third exemplary aspect of the present invention, also described herein is a machine-readable medium tangibly embodying a program of machine-readable instructions executable by a digital processing apparatus to perform the method of pricing a good or service to a customer of executing a pricing model that includes a dimension of a utility of the good or service to the customer.

Thus, the method of the present invention addresses the problem that services may be inadvertently priced too low using a conventional pricing model. In contrast, the method of the present invention considers pricing in the framework of competition, capacity, and value to the customer, so as to be able to find a set of prices that can increase overall revenue by improving pricing decisions and possibly bundling related solutions.

A key aspect of the method of the present invention is that value of an engagement to the client is determined quantitatively internal to the model and used as one factor in the pricing calculations, so that charges for services can be based upon this value, in contrast to the conventional methods in which cost of the engagement is calculated and a pre-determined percentage mark-up added to that cost.

The present invention provides a general framework from which to base pricing decisions, with an emphasis on a portfolio approach to pricing rather than "take it or leave it" pricing of the conventional methods. The present invention also incorporates current and future expected resource capacity into the pricing decision and allows a customer choices of a price based on immediate service, or possibly lower prices based on providing service at some point in the future when capacity would be more available.

BRIEF DESCRIPTION OF THE DRAWINGS

The foregoing and other purposes, aspects and advantages will be better understood from the following detailed description of a preferred embodiment of the invention with reference to the drawings, in which:

FIG. 2 shows an overview 200 of the mathematics underlying the method of the present invention;

FIG. 6 shows exemplary data matrix inputs 600 for scenario 400;

DETAILED DESCRIPTION OF EXEMPLARY EMBODIMENTS OF THE INVENTION

Figure 1:
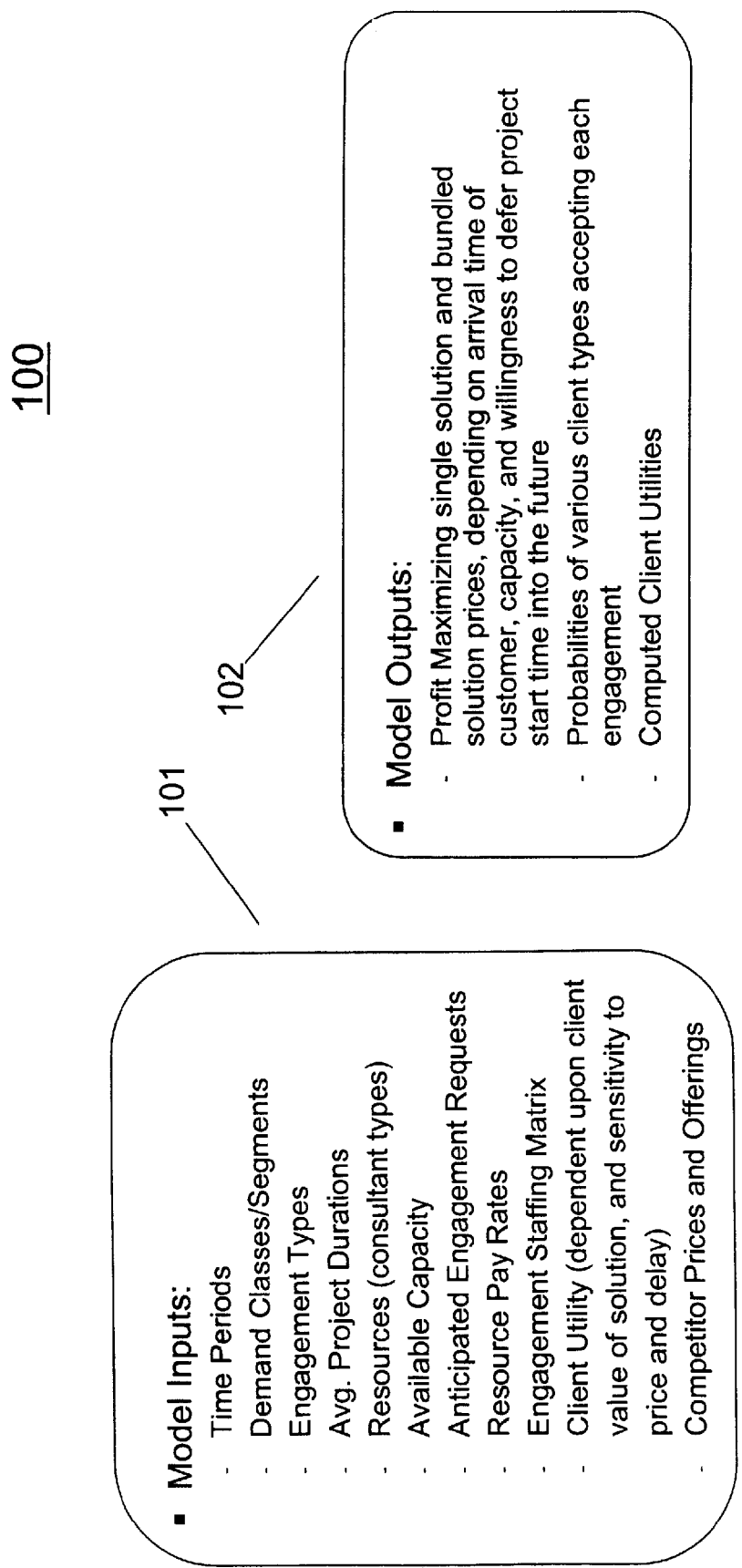
FIG. 1 shows an overview 100 of inputs and outputs of an exemplary embodiment of the computerized method of the present invention.

Referring now to the drawings, and more particularly to FIGS. 1-10, exemplary embodiments of the method and structures according to the present invention will now be described.

The present invention describes a capacity and value based pricing (CVBP) model exemplarily for professional services, although it should be apparent to one having ordinary skill in the art, after taking the description herein as a whole, that the concepts of the present invention are not limited to professional services. The CVBP model was developed in an effort to systematically correlate "value", along with several other attributes, into the price of professional services.

According to concepts of the present invention, the "stand-alone" value of the product is actually only one dimension of the pricing grid and should be considered in the context of other variables when determining the price of a particular service. The term "stand-alone" value is meant to connote the value of a product absent of external factors such as time, delivery, competition, etc.

While this may seem contradictory, it is easily understandable if one thinks about the products that consumers purchase. For instance, one may have some perception about the value for chewing gum. Depending on what time of day it is or the situation, the value that one subscribes to chewing gum changes. An instance of that may be that after a meal or before a meeting, the value is higher.

The "stand-alone" value of a good (or service) is thus its value of in the absence of special circumstances such as above. The CVBP model attempts to incorporate that "stand-alone" value, along with other variables, to arrive in a systematic way to a set of prices. It is important to note that the model itself does not derive the "stand-alone" value of the service, but incorporates that parameter, along with a host of others, in determining a price.

The model described in the present invention is meant to place the pricing decision for a particular service on a macroscopic level, by considering how the service fits into the context of all the other offerings of the provider, given various constraints. To be clear, the objective of the model is to allow the firm to maximize expected profits over a particular time period via the pricing decision variable. Thus, the model considers a finite time period over which to maximize revenue.

By considering pricing in the framework of competition, capacity, and value to the customer, the present invention can find a set of prices that can increase overall revenue, since improved pricing decisions and bundling of related solutions can increase revenue. Stated slightly differently, the method and tool of the present invention can be used to determine the "value" of the engagement to the client and provide a charge based on the value.

The CVBP model of the present invention and its output can be used in a number of ways. One such way is the example in which a consultant is negotiating the services contracts, to aid in setting prices for the work. In this usage, the output to the user will typically be a set of prices for the different engagements/bundles of engagements over different time periods and can be used to maximize the service provider's revenue.

Alternatively, a more sophisticated exemplary approach might be to incorporate the present invention as part of a web-based reservation system through which potential clients can try different scenarios for engaging in a service contract with the service provider; depending on the nature of the contract, its start date, its conditions, etc., the proposed price would vary, and the potential customer can then make an informed choice directly. In this usage, the output to the user is more typically a set of prices for the different engagements/ bundles of engagements over different time periods but could be useful for maximizing value to the user as well as allowing the potential purchaser to make a decision that helps maximize his revenues based on the options provided as alternative prices and the buyer's immediate needs.

Therefore, for both users, a model like the one presented herein can assist the user in increasing profits and smoothing demand. Of course, the present inventors do not intend that the uses of the present invention are limited to the two exemplary approaches just mentioned above.

Model Definition

Services contracts are referred to herein as "engagements", which are defined by the type of work to be performed as well as the conditions under which it should be performed. The work must be specified very clearly to be able to optimize profit of such labor-based services. In particular, the work must be characterized by the jobs to be performed, using a standardized language for describing job types.

Labor is referred to herein as "resources." Resources, which include, therefore, human resources when the invention is used to price services or professional services, must be classified. In an exemplary embodiment, the present invention makes use of a classification of the resources by skill set. Job types should be associated then with skill sets, where more than one skill set may be able to perform a job type, and vice-versa. For example, the job of computer programming can be accomplished by a resource with skill sets in Java development, C programming, etc. Similarly, the skill set of an IT applications architect may be able to perform the jobs of website development as well as applications integration.

This careful characterization of services work and of labor skills is an important part of profit management for the services industry, in much the same way as a bill-of-resources allows for effective supply chain optimization.

Customers of the service can be grouped together into segments for the purpose of categorizing the types of services that they typically request, the urgency of the work, and the prices they are willing to pay. Customer segmentation is typical on an individual level, such as in airline seat revenue management, and the same notion is applied here to business-to-business customers of professional services.

The contracts between the customer and the service provider are useful for the model building. Contracts specify the duration of the engagement and the nature of the work to be performed, as well as the price, billing parameters, and penalty clauses. These elements should be captured as part of the profit management problem for services.

FIG. 1 shows an overview 100 of inputs 101 and outputs 102 of an exemplary embodiment of the CVBP model of the present invention having the objective to provide a general framework from which to base pricing decisions. The model provides an emphasis on a portfolio approach to pricing, in contrast to some conventional "take it or leave it" pricing approaches and, as shown in the outputs 102, the model can be used to maximize profits for single solution and bundled solution prices.

FIG. 2 shows an overview 200 of the mathematics underlying the capacity- and value-based pricing model of the present invention. As mentioned above, objective function 201 can be used to allow the firm to maximize expected profits over a particular time period via the pricing decision variable, using a finite time period over which to maximize revenue. The objective function 201, constraints 202, and computations 203 are discussed in detail below.

As can be seen from FIG. 2, the objective function is actually an exercise in maximizing price r (for the service provider), with its multiple indices, since the remaining decision variables are functions of r, and can, therefore, be used to maximize revenue. Any software program that can solve non-linear optimization can be used, including, for example MAT- LAB®, but there are many other software packages available to use in an application program that implements the present invention.

In an exemplary embodiment described below, the user's "value" is modeled in the utility variable U, but this customer value is part of the internal workings of the model only and is not an output actually presented to the user. The utility is modeled through a mathematical expression containing a number of parameters to be calibrated from historical data. For instance, by examining past choices of customers for the same or similar engagements, values can be assigned to the parameters of the utility functions. Then, the utility functions can be used as part of the overall model to best determine the prices which reflect an optimization of the service providers revenue and the likely choices of customers. In other words, the modeling of the user's utility allows the model to output a set of prices that best reflects what the user is willing to pay and that optimizes the service providers revenue. In an exemplary embodiment discussed herein, the output to the user is a set of prices for the different engagements/bundles of engagements over different time periods.

The model itself used in the present invention is defined through several inputs and parameters which consist of the following:

N≡The number of customer segments that have been specified a priori. In general, the markets for a given product can be segmented based on how a particular portion of the market values the product. On the most atomic level segmentation can take place on an individual basis, which would result in each customer being charged a price based on his true value of the product. This results in what is known as first degree price discrimination or "perfect price discrimination," which is, in general, impracticable. The model presented here can handle any level of segmentation because it takes the segmentation, and associated information, as an input. The model will ultimately suggest a palette of prices to be offered to the various segments for the particular services.

M≡The number of engagement types that are under consideration. An engagement is assumed to consist of, at a minimum, the fulfillment of one service, but can also consist of all available services at a given firm. Allowing an engagement to consist of more than one service permits capturing the value associated with services that are purchased as a bundle, and helps to come to an understanding of how to price the bundle of services.

T≡The number of time periods under consideration. As was mentioned before, the model as it is currently constructed considers a finite period over which to maximize expected profit through pricing. The pricing decision in our model is highly dependent on dynamic aspects, and consequently, the selection of this parameter has an impact on the pricing decision.

R≡The number of skill or job types necessary to complete all services under consideration in the model. The various skill types required for a particular service directly impact the cost of implementing that service, and consequently are important in the final pricing decision.

$d_i^s$≡The aggregate demand over all engagements for a customer segment i, in a given period s. A forecast for his parameter may be obtained through historical customer data.

$\mu_{ij}$≡The average contract length, in days, of engagement type j, for customer segment i. The total engagement cost of engagement type j for customer segment i will depend both on the daily cost as well as the length of the contract. For a particular engagement type some of this variation can be captured through the customer-segment dependent parameter, $\mu_{ij}$.

$\rho_k^t$≡The daily pay rate for a resource of skill-type k, for period t. $\rho_k^t$ is a given parameter which further helps to characterize the cost associated with a given engagement.

$Z_k^t$≡Represents the "inventory" available for a particular skill type k in period t. In other words, it represents the capacity level that is currently available to service the various engagements. This parameter is critical in that the price is directly affected by the current level of capacity, in addition to expected future capacity.

$v_{ij}$≡Represents the utility a customer from segment i would receive from an engagement of type j, at no cost. This parameter represents the "stand-alone" value that was discussed earlier. This is provided as an input to the model, and represents one factor in determining a customer's overall utility, or how they feel about the product.

$\alpha_{ij}$≡represents the sensitivity of customer segment i to the price of engagement type j.

$\beta_{ij}$≡represents the sensitivity of customer segment i to a delay in the commencement of an engagement j. This parameter attempts to capture how a particular segment values the immediate begin of an engagement, as opposed to a delay in the project start.

Both sets of parameters, $\alpha$ and $\beta$, require calibration based on historical data about customer choices and can be somewhat based upon the customer segmentation mentioned previously.

$\theta$≡is a parameter of the logit probability function that indicates the uncertainty level of customers. This parameter is also influenced by customer segmentation.

$A \in \Re^{M \times R}$=Daily staffing matrix. Element $a_{jk}$ represents the percent of total time that a resource of skill-type k is required to work on an engagement of type j.

Decision Variables and Auxiliary Computations

Price, a key decision variable of the present invention, directly affects the values of auxiliary computations, which in turn affect the overall expected output. Changes in the price ultimately affect demand via changes in customer utility, which in turn affects a customers' probability of requesting a particular service. In the model used herein, prices are established along four dimensions.

$r_{ij}^{st}$≡The price of engagement of type j for customer segment i, given that the current period is s, and the engagement begins in period t.

$U_{ij}^{st}(r)$≡The utility of a customer of segment i, for an engagement of type j, given that it is period s, and the solution engagement will commence in period t. These are computed as a function of the price.

$p_{ij}^{st}(r)$≡The probability of a customer of segment i accepting an engagement of type j, given that the current period is s, and the engagement commenced in period t. These are computed as a function of the price and utility.

$g_j^t(r)$≡The expected number of active engagements of type j at time t, as a function of prices and probabilities.

Decision Model Description

The components of the model shown in FIG. 2 will now be described in more detail.

Objective Function:

$$\max_{r} \sum_{j=1}^{M} \sum_{t=1}^{T} \left[ \sum_{s=1}^{t} \left( \sum_{i=1}^{N} d_i^s p_{ij}^{st}(r) r_{ij}^{st} - g(r)_j^t \sum_{k=1}^{R} a_{jk} \rho_k^t \right) \right]$$

The objective function represents the expected profits over the finite time horizon that is being considered. The inner terms represent our expected profit function for a particular engagement package:

$$\pi_{ij}^{st}(r_{ij}^{st}) = d_i^s p_{ij}^{st}(r) r_{ij}^{st} - g_j^t \sum_{k=1}^{R} a_{jk} \rho_k^t$$

where $d_i^s p_{ij}^{st}(r) r_{ij}^{st}$ when summed over all indices, represents the total revenue obtained from signed engagements within the given time horizon. From this is subtracted the total cost of providing these engagements, which is represented by $$g_j^t \sum_{k=1}^{R} a_{jk} \rho_k^t.$$

While the costs may accrue over the course of providing the engagement, for the sake of bookkeeping, it can be assumed that all costs are incurred upfront. This expected cost is calculated by multiplying the expected number of engagements of type j, and multiplying that by the time required from skill type k, and multiplying that by the cost per period of that particular skill type. When summed over the appropriate variables, the total cost incurred in the respective time horizon is obtained.

(Capacity Constraint): Equation (2)

$$\sum_{j=1}^{M} a_{jk} g(r)_j^t \leq z_k^t, \forall t = 1 \ldots T, \forall k = 1 \ldots R$$

This equation constrains the number of engagements that the organization is able to commit to, based on the capacity available in each period. As noted before, $Z_k^t$ represents the capacity of skill-type k available in period t. Thus, the resources required by the total service commitments cannot exceed the available capacity in period t.

$$\sum_{j=1}^{M} a_{jk} g(r)_j^t$$

represents the expected required capacity in period t. This expected capacity is calculated by multiplying the expected number of engagements of type j, $g_j^t(r)$, by the percent of total time that a resource of skill-type k is required to work on an engagement of type j. It can be assumed that the necessary time required to complete the project, by a particular skill-type is spread evenly across each period. Thus, if engagement j takes 20 periods to complete, and resource k is required for 30% of the total periods, then in each of the 20 periods resource k will be required for 30% of that period. If the periods represent days, then resource k commits 0.3 days to that engagement in each period. Consequently, after summing across each engagement for a given period, and a given skill type, one can ascertain the total capacity necessary to complete our expected engagements in period t, for which we cannot exceed $Z_k^t$.

$$g(r)_j^t = \sum_{i=1}^{N} \sum_{s=1}^{t} \left[ \sum_{v=\max(t-\mu_{ij}+1,s)}^{t} d_i^s p_{ij}^{sv}(r) \right] \forall j = 1 \ldots N,$$

$$\forall t = 1 \ldots T$$

Equation (3)

The expression $g_j^t(r)$ is defined to calculate the expected number of active engagements of type j at period t. The calculation consists of three summations. The first summation $$\sum_{i=1}^{N}$$

is defined to sum across all customer segments. The next summation $$\sum_{s=1}^{t}$$

sums across all time periods from time period 1, until the current time period t. The third nested summation, $$\sum_{v=\max(t-\mu_{ij}+1,s)}^{t} d_i^s p_{ij}^{sv}(r),$$

begins at $v=\max(t-\mu_{ij}+1, s)$ and sums until t. To understand the logic behind $v=\max(t-\mu_{ij}+1, s)$, one must first make sense of the summand, $d_i^s p_{ij}^{st}(r)$. The term denotes the expected number of engagements of type j, for customer segment i that were purchased in period s and that will begin in period v. Engagements can only have been purchased in periods up until time t, which explains why our second summation stops at time s=t.

To understand the last summation, it helps to note that at time t there are two types of engagements which are being serviced. 1) Those engagements that were purchased prior to period t, with the intent that they begin in time period t. 2) Those engagements that began in a period prior to t, but because of the length of the contract, they still require resources at time t. At time t, for a particular engagement, and customer type, the average time it takes to complete such an engagement is known, which was earlier denoted by $\mu_{ij}$. Consequently any engagement of type j for segment i, which started in the time frame from $[t-\mu_{ij}+1, t]$ will still be taking up resources at time t. The reason the maximum of the two starting points is taken is to eliminate instances when $t-\mu_{ij}+1 \leq 0$.

Equation (4) (Utility):

$$U_{ij}^{st} = v_{ij} - \alpha_{ij} * r_{ij}^{st} - \beta_{ij} * (t-s) \forall s, t = 1 \ldots T, \forall i = 1 \ldots N, \forall j = 1 \ldots M$$

For a given price charged, the present invention is able to determine the utility that would be provided to customer i, if they purchased engagement j in period s, to begin in period t. The parameters were previously defined, but the linear structure of the function should be noted. The function subtracts from the "stand-alone" value of the engagement, the price sensitivity multiplied by the price, along with the delay sensitivity multiplied by the delay of implementation (t−s).

(Logit): Equation (5)

$$p_{ij}^{st} = \frac{e^{\theta U_{ij}^{st}(r_{ij}^{st})}}{e^{\theta U_{i0}^{s}} + \sum_{t'=s}^{T}\sum_{j'=1}^{M} e^{\theta U_{ij'}^{st'}(r_{ij'}^{st'})}} \quad \forall s,$$

$$t = 1 \ldots T, \forall i = 1 \ldots N, \forall j = 1 \ldots M$$

The multinomial logit model is used to model the discrete choice decision making which occurs when a client agrees to purchase a particular engagement package. If certain properties of the utility function hold, then the probability that a given customer segment i chooses engagement of type j, given that the current period is s, and the engagement commences in period t is given through the logit model, by weighting the utility of a given engagement with respect to all other options. The θ parameter, which is allowed to vary between 0 and 1, provides a level of "uncertainty" in the probability determination. If θ=0, the probabilities are completely independent of customer utility, with every choice occurring with equal probability. As θ tends to 1, the utility has a higher influence on the final probability distribution.

The parameter θ can be derived from historical data, either for the customer specifically, if such historical data is available for the specific customer. Alternatively, a value can be derived for a new customer, using a value for a customer deemed to have similar characteristics and/or a default value can be used. The parameter θ will also be updated over time as more data is accumulated on the customer.

Equation (6) (Monotonicity Constraints):

$$r_{ij}^{st} \leq r_{ij}^{s(t+1)} \forall s, t \leq s = 1 \ldots T, \forall i = 1 \ldots N, \forall j = 1 \ldots M$$

These constraints are designed to place bounds on the price of a particular engagement depending on what period it will begin, relative to the same engagement in different periods. The constraints are used to implement desired price policies. In many cases, the constraints state that the price charged in period s for engagement j to customer should decrease in t. In other words, the price for the same product, to the same customer, should be reduced if the customer is willing to purchase now, but have the commencement delayed. In some cases, such as may occur at the end of a billing period, it is desirable to encourage customers to purchase and commence service earlier. In this case, the monotonicity constraints would be reversed, such that the opposite holds.

Equation (7) (Non-Negativity Constraints):

$$r_{ij}^{st} \leq 0 \forall s, t=1 \ldots T, \forall i=1 \ldots N, \forall j=1 \ldots M$$

These constraints are included to ensure that prices are non-negative.

It should be noted at this point that, in an exemplary embodiment, we proxy competition via a single engagement bundle. That is, of all the engagement bundles that are considered, it is assumed that one bundle represents the available offerings from competitors, and is associated with a given price. As a consequence, the probabilities that result from the logit model are directly affected by the representative competitor.

Data Sources for the Model

It should be clear that the technique of the present invention selectively requires data for pricing different bundles of services at different times. Of course, this information could be entered manually by the user for each bundle and time, with perhaps default values for various parameters or other guidelines for entering a range of values for various services and/or customers. Alternatively, in an exemplary more automated method, the necessary data is automatically extracted from a database storing various resources needed for various potential services.

In this more integrated approach, the present invention can extract the necessary data autonomously from an integrated database that represents resources and related data of the entire organization, including resources that are currently committed for various projects, as well as committed future projects. This integrated database thus provides a quantitative indication of available resources in the future, including resources necessary for various possible bundles of services that might be of interest during negotiation, as well as historical data related to previous negotiations for various services and various customers.

Figure 3:
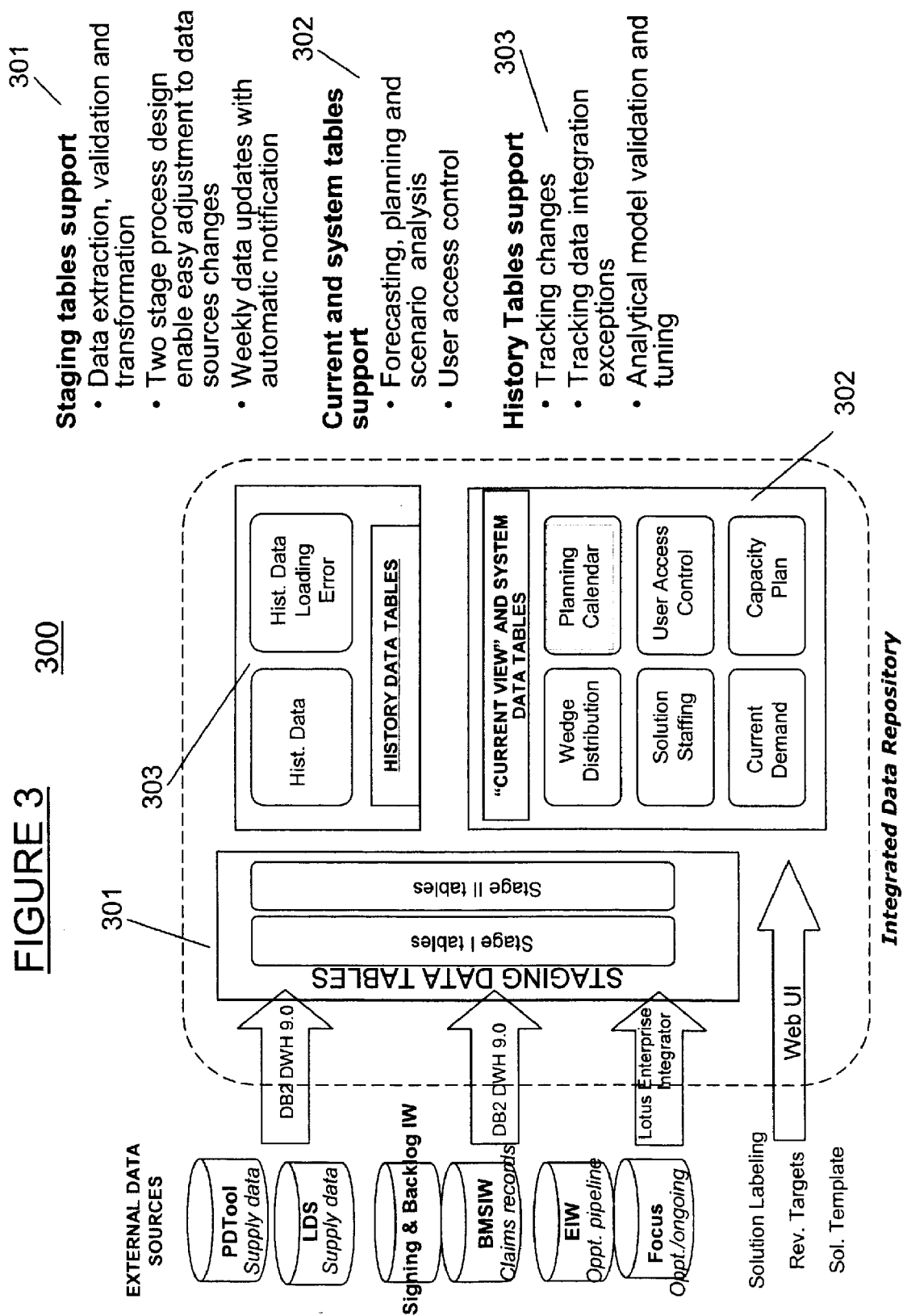
FIG. 3 shows an overview 300 of an exemplary integrated data source that provides data for the method of the present invention.

Thus, in one exemplary embodiment, the computerized method of the present invention includes an aspect of having access to such an integrated database reflecting data from the entire organization related to personnel resources and other management information, as exemplarily shown in FIG. 3 and as discussed in more detail in commonly-assigned U.S. patent application Ser. No. 11/621,942 to Cao et al., filed on Jan. 10, 2007. The contents of this co-pending application are incorporated herein by reference. FIG. 3 depicts one possible implementation for such data integration 300 within an entire organization, to manage and integrate a large number of data sources into a unified repository, thus eliminating the need for manual data collection, processing and validation, as well as automatic updates of data.

The exemplary data integration plan has been designed as a three-step process.

1. The first step 301 is to compose two staging sub steps with the stage I tables that bring data from external data sources (stage I tables have almost exact format of their counter parts in the external data sources). The data validation/transformation is done in the stage II tables through intensive data validation, based on system defined reference tables. Only valid data past the first step will be ready to get into the "current view", which will be used to support run time system functionalities. This two-stage design enables easy adjustment to data source changes, and ensures that the performance of the system will not be affected by errors and by time consuming data validation processes.

2. The second step 302 is the data loading process from the staging II tables to the "current view" tables. During this step certain business rules could be implemented. For example, for capacity planning, a certain revenue threshold is applied to filter out very small revenue opportunities. This type of business rules is preferably implemented in the second step in data integration layer, rather than within the other system layers, because this approach provides better performance and flexibility to changes.

3. For the third step 303, new data is read from the first step and "current view" data is rolled out and loaded into the history tables. With the rich history tables, the work force system supports tracking changes and exceptions from data integration. Also, the history data is critical for building robust analytical models and supports its validation and tuning.

Thus, in an exemplary embodiment, the CVBP model tool of the present invention envisions access to a similar integrated database in order to provide an automatically updated, end-to-end database for the organization using the computerized tool of the present invention, although the present invention would function with a less comprehensive database, as long as the information for pricing different bundles of service at different times is available.

It is noted that all the variables discussed above in the model are clearly available from the integrated database described above and that most organizational databases having historical pricing information would be adaptable to finding information for calculating the various parameters of the above-discussed model.

The data for specific projects or tasks or jobs could exemplarily be loaded into the model described above in matrix format, such as shown in FIG. 3, so that re-bundling of services could be readily done using templates of data in matrix format for each segment of the different bundles. These matrices could be stored in memory for the different services that the organization intends to offer, so that the user could "point and click" to make up a new bundle of services for pricing.

EXAMPLE

Figure 4:
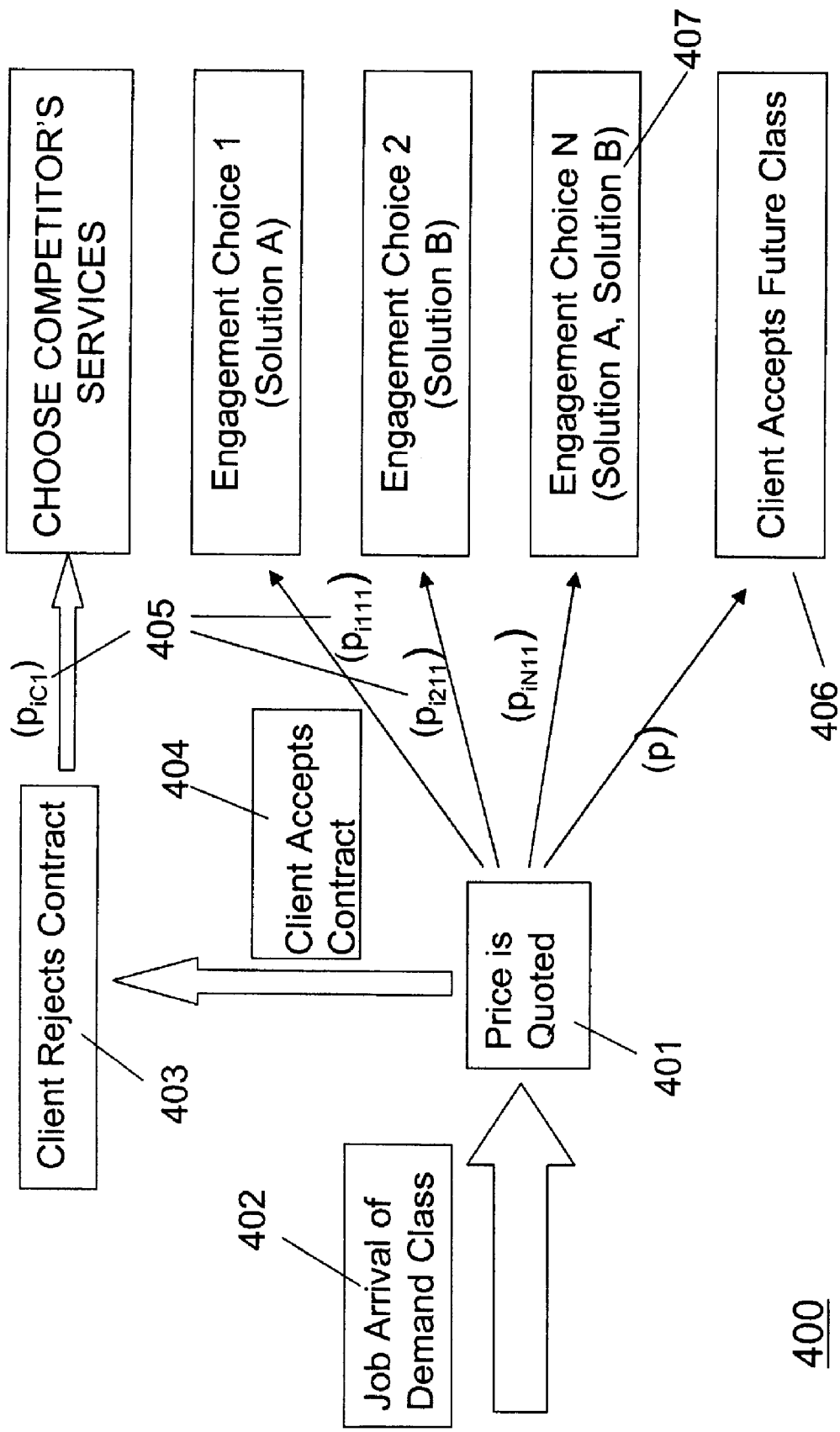
FIG. 4 shows an exemplary scenario 400 used to illustrate the present invention.

An illustrative example of an application of the present invention is shown in the scenario 400 of FIG. 4, which illustrates how the prices produced by this model may be quoted 401 when a potential user arrives 402, then either a client rejects the potential contract 403, or accepts 404. FIG. 4 illustrates period s=1. The probabilities 405 that the users accept each type of contract are computed, that is for each type of engagement starting at each potential starting time in the horizon being modeled.

"Client Accepts Future Class" 406 means that the client accepts one of the company's offerings starting not in the current time period but a future one. These too have probabilities, as do the bundles of engagements 407 represented in FIG. 4.

As can be seen exemplarily from FIG. 4, the present invention provides a computerized method wherein the user has a palette of choices, including, among others, the ability to combine different bundles of services and the ability to determine price for different time periods.

Figure 5:
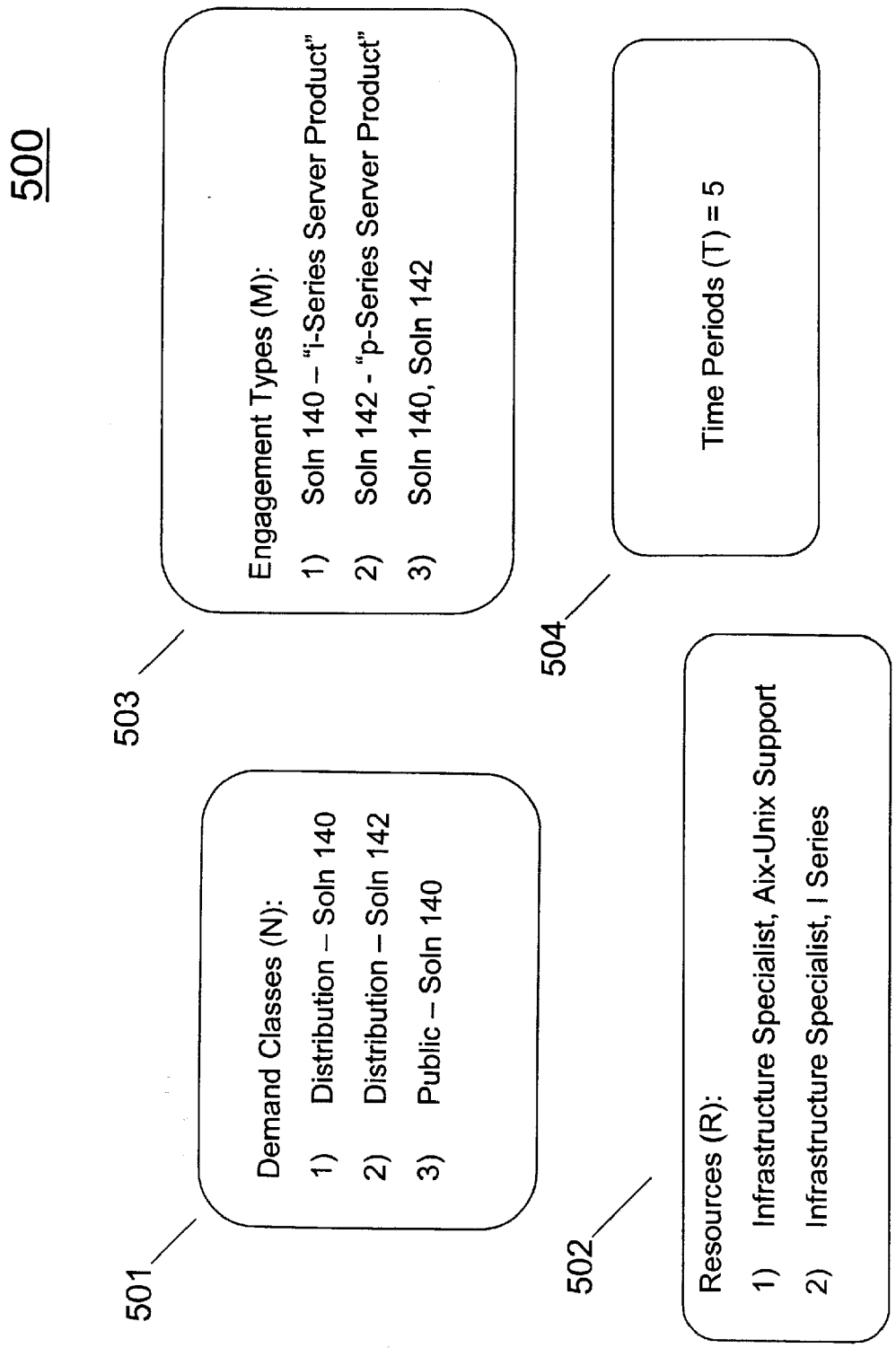
FIG. 5 shows the inputs 500 of scenario 400 shown in FIG. 4.

FIG. 5 gives some examples 500 of the type of data used as inputs 501-504, and FIG. 6 gives some examples 600 of the types of numbers that may be used and demonstrating that data can be entered in matrix format 601-604. The dimensions of FIG. 6 are listed in FIG. 5.

It should be clear from this example, that resources and demand classes would be readily available from the integrated database discussed above and that potential engagements could be prepared in advance as predetermined offerings, as well as easily customized by user inputs.

Figure 7:
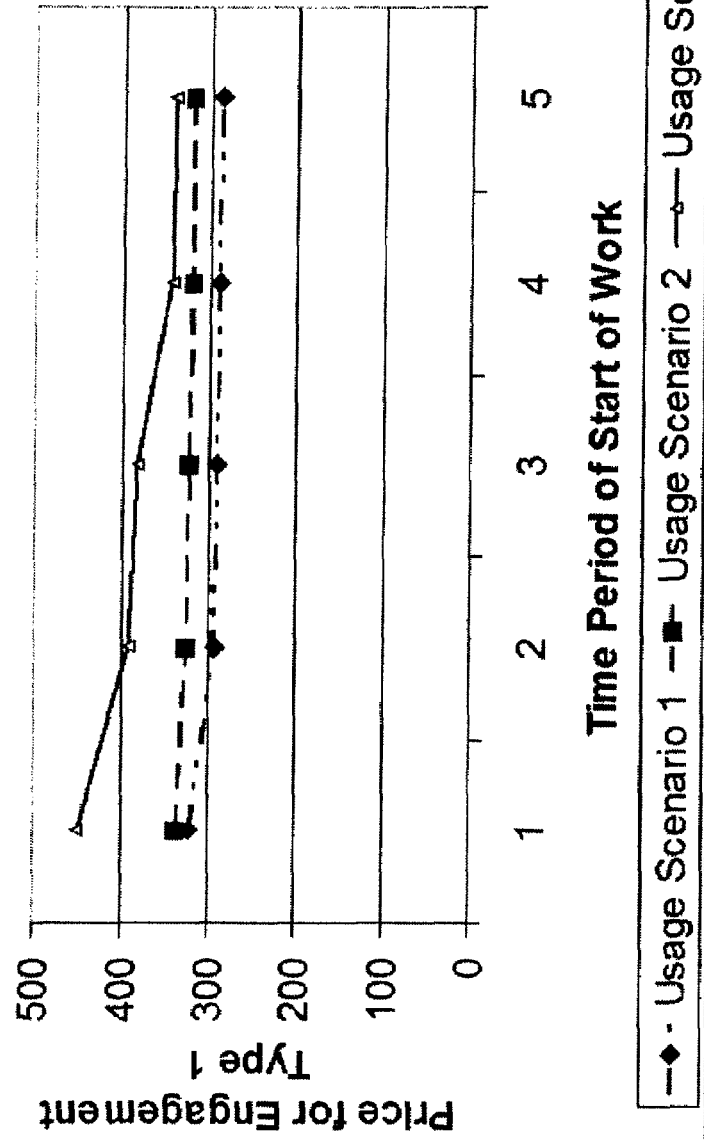
FIG. 7 shows a typical output 700 of an actual test scenario.

FIG. 7 shows an exemplary output 700 from an actual scenario tested that was not the same as shown in FIGS. 5 and 6. The three usage scenarios show how the optimal price changes as the user allows the starting point of the engagement to be delayed in time from the user's time of arrival.

Specifically, in the instance shown, the user arrives at time T=1, and, if the work must start immediately, the price is highest. As the starting time moves out, the proposed optimal price is lower. The decrease in price is most dramatic in Scenario 1, where the user demand is somewhat lower than in the Usage Scenarios 2 and 3. With the higher demand in those latter scenarios, the benefit to delaying the work is not so great, since the service provider will need the resources for the other users in the later periods.

From the above description of scenario 400, it can be seen that the present invention can be used to provide prices adapted to user willingness to pay and the ability to smooth demand over time through targeted pricing, traits that are useful to the provider of services. Also for the benefit of the service provider, the method can be used for improved revenue, more sales of engagements through improved pricing of bundles of engagements, better use of capacity and resources, easier planning through avoiding demand congregating around certain periods, again through demand smoothing.

It also has the ability to adapt prices to other scenarios such as lower prices for reserving well in advance, or for carrying out the work of the engagement immediately, or in particularly desirable parts of a billing period, which are benefits that might be useful to the buyer of services, if the method were to be made available through, for example, the web-based reservation system mentioned above.

For either the service provider or the service buyer, the method could be useful for improved revenue and easier planning by avoiding certain periods.

Exemplary Software Implementation

Figure 8:
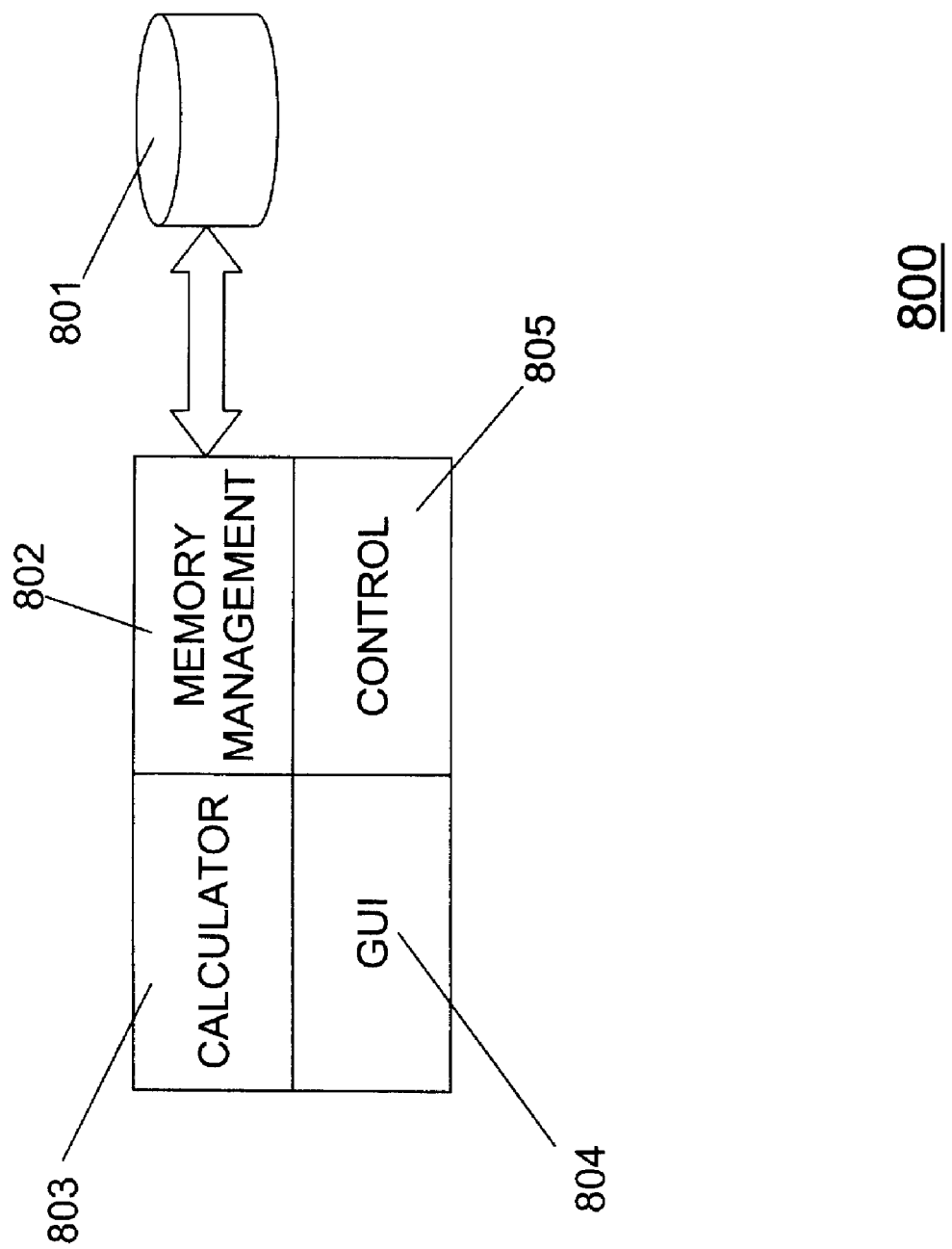
FIG. 8 shows a block diagram 800 exemplarily used to implement an application program implementing the present invention.

FIG. 8 shows a block diagram 800 of an exemplary application program that might be used to implement the concepts of the present invention. Memory 801 includes a database that provides data related to the calculations described above. As mentioned previously, this database might result from integration of data from throughout the organization, such as shown in FIG. 3.

Memory management module 802 of the application program provides access to this database for different times and service bundles. Calculator module 803 performs the calculations exemplarily described above and would include a standard optimization subroutine for maximizing the objective function. Graphical user interface 804 permits a user to interact with the application program, to enter user inputs and information, and to view the results of the application program. Control module 805 is the main function of the application program that invokes the various subroutines represented by the other modules of the application program, as based on user inputs and commands.

Exemplary Hardware Implementation

Figure 9:
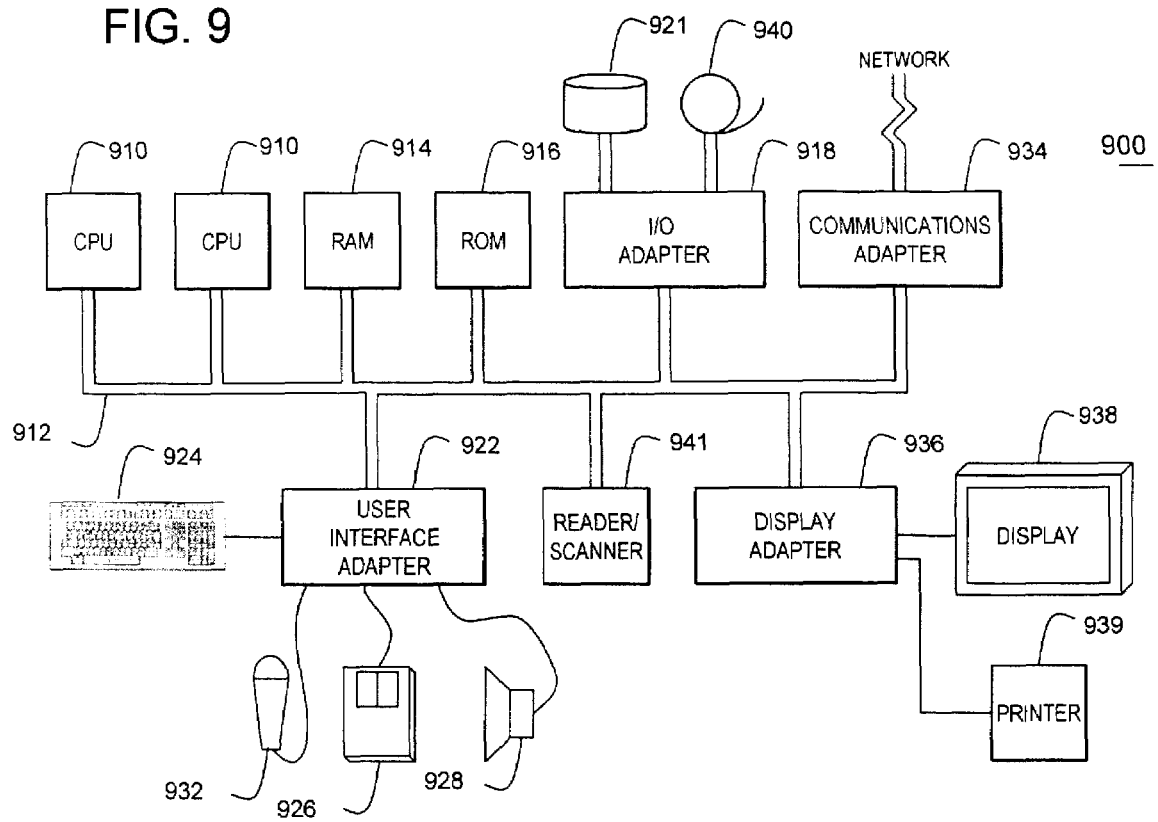
FIG. 9 illustrates an exemplary hardware/information handling system 900 for incorporating the present invention therein.
Figure 10:
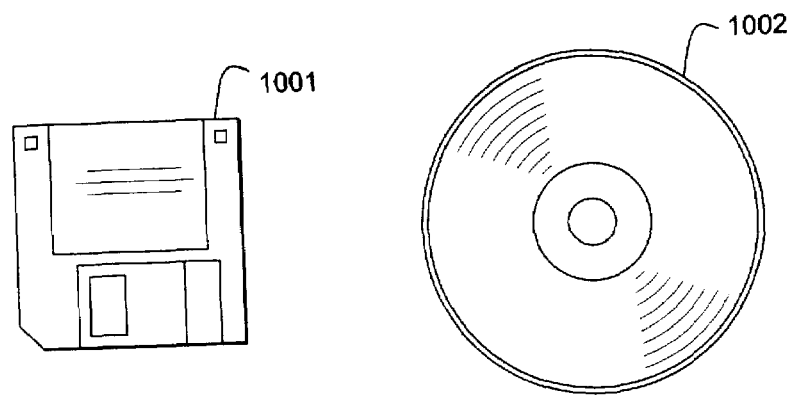
FIG. 10 illustrates a signal bearing medium 1000 (e.g., storage medium) for storing steps of a program of a method according to the present invention.

FIG. 9 illustrates a typical hardware configuration of an information handling/computer system in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media 1000, such as a magnetic data storage diskette 1001 or optical disc 1002 (FIG. 10), directly or indirectly accessible by the CPU 911.

Whether contained in the diskette 1001 or disc 1002, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Thus, it can be seen from the discussion above that the present invention provides a new approach to pricing of professional services. Advantages of the method include that it allows for a portfolio approach to pricing and incorporates current and future expected resource capacity into pricing decisions. It also allows a customer the choice of a price point now, or a lower price in the future when capacity is more available.

The present invention also incorporates the ability to provide bundled services solutions into the pricing and customer choice and provides a basis from which a sales representative can effectively negotiate and can help alter incentive structure.

Prices can be adapted to user willingness to pay and the present invention provides the ability to smooth demand over time through targeted pricing and the ability to adapt prices to other scenarios such as lower prices for reserving well in advance, or for carrying out the work of the engagement immediately, or in particularly desirable parts of a billing period.

The present invention can be used for improved revenue, more sales of engagements through improved pricing of bundles of engagements, better use of capacity and resources, easier planning through avoiding demand congregating around certain periods, again through demand smoothing While the invention has been described in terms of exemplary embodiments, those skilled in the art will recognize that the invention can be practiced with modification within the spirit and scope of the appended claims.

Thus, for example, although the above description involved professional services, it is intended that the concepts of the present invention are equally applicable to pricing for services in general, as well as pricing for goods.

Further, it is noted that, Applicants' intent is to encompass equivalents of all claim elements, even if amended later during prosecution.

Having thus described our invention, what we claim as new and desire to secure by Letters Patent is as follows:

1. An apparatus, comprising:
    a processor for executing machine-readable instructions; and
    a memory device storing a program of machine-readable instructions,
    wherein said program of machine-readable instructions comprises instructions for executing a calculator for pricing a good or a service to a customer based on processing an objective function for expected profits over a finite time horizon being considered, said finite time horizon having a plurality of time intervals, said calculator executing a pricing model that includes a dimension of a utility of said good or said service to said customer, said utility comprising an adjustment of a stand-alone value of said good or said service, said stand-alone value comprising a value of said good or said service absent external factors including time, delivery, and competition,
    wherein, for a given price charged, said utility is calculated in said model by modifying said stand-alone value of an engagement by a price sensitivity multiplied by the price and a delay sensitivity multiplied by a delay of implementation,
    and wherein said objective function incorporates said utility as reflected in a component in said objective function that defines a probability of acceptance of an engagement by said customer, as calculated using said utility.

2. The apparatus of claim 1, said pricing model further comprising a capability to consider bundled goods or services solutions.

3. The apparatus of claim 1, said program of machine-readable instructions further comprising instructions for:
    a receiver to receive data for said pricing model; and
    a graphical user interface to permit a user to control said calculator and to display a result of said pricing model.

4. The apparatus of claim 1, wherein said pricing model involves a service, and input data for said pricing model is received from a database that is integrated for information for an entirety of an organization offering said service.

5. The apparatus of claim 4, wherein said integrated information is automatically inputted to said database.

6. The apparatus of claim 1, wherein an output of said pricing model comprises a set of prices for a predetermined number of time periods.

7. The apparatus of claim 1, wherein said calculator comprises an optimization subroutine for maximizing the objective function of said pricing model.

8. The apparatus of claim 1, wherein executing said pricing model comprises optimizing said objective function that represents expected profits over said finite time horizon being considered, as solved by a nonlinear optimizer executed by said calculator, using data stored in a matrix format.

9. The apparatus of claim 1, wherein said utility is modeled through an expression containing a number of parameters calibrated from historical data stored in a database.

10. The apparatus of claim 1, wherein said program of machine-readable instructions further comprises instructions for a data integrator for extracting data for said pricing model autonomously from an integrated database that represents resources and related data for an entire organization, including resources currently committed for projects, as well as resources committed to future projects.

11. The apparatus of claim 1, wherein said probability of acceptance is calculated from a function involving said utility, by weighting a utility of a given engagement with respect to all other options for said customer, a value of said weighting for said utility being derived from one of historical data related to said customer, data of a second customer deemed similar to said customer, and a default value for new customers.

12. The apparatus of claim 1, wherein said objective function represents a total revenue obtained from signed engagements within the finite time horizon, as summed over all of a plurality of indices, from which is subtracted a total cost of providing these engagements.

13. The apparatus of claim 1, wherein said pricing model further comprises a calculation of a capacity constraint that comprises a number of engagements that an organization is able to commit to, based on a capacity available to be provided by said organization for skill-types needed for each engagement for each period of said finite time horizon for each skill type.

14. A computerized method for pricing a good or a service to a customer, said method comprising:
   executing, using a processor on a computer, a pricing model that includes a dimension of a utility of said good or said service to said customer and that maximizes an objective function for expected profits over a finite time horizon being considered, said finite time horizon having a plurality of time intervals,
   wherein said utility comprises an adjustment of a stand-alone value of said good or said service, said stand-alone value comprising a value of said good or said service absent external factors including time, delivery, and competition,
   wherein, for a given price charged, said utility is calculated in said model by modifying said stand-alone value of an engagement by a price sensitivity multiplied by the price and a delay sensitivity multiplied by a delay of implementation,
   and wherein said objective function incorporates said utility as reflected in a component in said objective function that defines a probability of acceptance of an engagement by said customer, as calculated using said utility.

15. The method of claim 14, said pricing model further comprising a capability to consider bundled goods or services solutions.

16. A non-transitory machine-readable storage medium tangibly embodying a program of machine-readable instructions executable by a digital processing apparatus to perform a method of pricing a good or a service to a customer, said method comprising:
   executing a pricing model that includes a dimension of a utility of said good or said service to said customer and that maximizes an objective function for expected profits over a finite time horizon being considered, said finite time horizon having a plurality of time intervals,
   wherein said utility comprises an adjustment of a stand-alone value of said good or said service, said stand-alone value comprising a value of said good or said service absent external factors including time, delivery, and competition,
   wherein, for a given price charged, said utility is calculated in said model by modifying said stand-alone value of an engagement by a price sensitivity multiplied by the price and a delay sensitivity multiplied by a delay of implementation,
   and wherein said objective function incorporates said utility as reflected in a component in said objective function that defines a probability of acceptance of an engagement by said customer, as calculated using said utility.

17. The storage medium of claim 16, said pricing model further comprising a capability to consider bundled goods or services solutions.

* * * * *